Aug. 6, 1968 W. J. FREIER 3,395,919

RECORD PLAYER ADAPTER

Filed Oct. 21, 1965 2 Sheets-Sheet 1

Inventor.
Walter J. Freier.
By. Brown, Jackson, Boettcher & Dienner
Att'ys.

RECORD PLAYER ADAPTER

Filed Oct. 21, 1965

2 Sheets-Sheet 2

Inventor.
Walter J. Freier
By Brown, Jackson, Boettcher & Dienner
Attys.

1

3,395,919
RECORD PLAYER ADAPTER
Walter J. Freier, Benton Harbor, Mich., assignor to V-M Corporation, Benton Harbor, Mich., a corporation of Michigan
Filed Oct. 21, 1965, Ser. No. 499,500
2 Claims. (Cl. 274—39)

ABSTRACT OF THE DISCLOSURE

An easily positionable record player adapter for enabling records having central holes of different diameters to be centered on the turntable of a record player. The adapter includes a disc portion and an integral hollow cylindriacl ring and is mounted on a spindle so as to be movable between a lower position whereat the disc portion is contained within a depression in the turntable such that a record with a small center hole may be centered by the ring and an upper position whereat the disc portion is positioned to center a record with a large center hole. A U-shaped spring, which is seated on shelves formed in the disc portion, positively latches into a selected one of two grooves on the spindle to position the adapter in its lower or upper position.

*Disclosure*

This invention relates to a record player adapter and more particularly to an easily positionable apparatus for enabling records having central holes of different diameters to be centered and played on the same record player.

It is known to provide adapters which accommodate recording discs having center hole openings of various diameters. Adapters may reduce the number of turntables that are required in radio broadcasting studios. Literally thousands of amateur enthusiasts purchase records having variously sized center orifices so that a turntable provided with an adapter is a boon to them. Presently some turntables have central openings into which a centering spindle may be recessed when its use is not required. Such spindles are axially moved from within and below the phonograph turntable, and require elaborate and expensive mechanical linkages.

The present invention provides an adapter which is an integral part of a record player and selectively accommodates records with central holes of differing diameters by a manual grasping of the adapter from a location outside the player apparatus. Basically the present invention provides a record centering device for a phonograph player having a supported, rotatable turntable with a centrally located depressed pocket and an axial bore of an area which is smaller than the area of the pocket. Positioned axially within the bore is a stationary spindle with a portion extending above the upper surface of the turntable about the pocket. A plurality of spaced-apart depressed portions or reliefs are formed in the extending portion.

An axially movable adapter is provided having a first or lower annular disc which may be depressed into the pocket for providing a relatively smooth surface with a plane established by the top of the turntable and also raised thereabove for centering a record with a large center hole. Said adapter is also provided with an annular ring which projects above the disc for centering a record with a small center hole. When integrated with the player, the adapter coaxially surrounds the spindle and is vertically movable along the spindle. A hair pin or U-shaped spring is attached to the adapter by suitable means so that the spring latches into selected of the depressed portions for positively positioning the adapter on the spindle at selected heights therealong and in a relatively level plane. The spring is conveniently cammed out of one depression and latched into another when the adapter is moved.

2

Thus through the use of a hair pin-shaped spring secured to the movable part of the record centering apparatus, different level positions of the adapter may be obtained by detenting the spring into the depressed portions on the spindle. Lifting the adapter places the larger diameter disc at a raised position above the plane of the turntable whereby large centerhole records are maintained in a concentric position relative to the center of rotation of the turntable. Axially depressing the adapter with a small hole record or by hand forces the larger disc portion down below the planer surface of the turntable and its cover and permits only the small diameter ring portion to remain in position to locate a small centerhole record concentrically with the rotational center of the turntable. The raising and lowering movements are performed manually from the outside of the player without any complex mechanisms.

It is an object of the present invention to provide an adapter for accommodating a phonograph record player to play records having differently sized centering orifices.

A further object of the present invention is to provide in conjunction with a player mechanism, an adapter for centering records which is convenient, manually adjustable and positively positionable.

Another object of the present invention is to provide an adapter which is simple in construction and readily mass produced at low unit cost.

An additional object of the present invention is to provide the user of a phonograph record player with an adapter which is an integral part of the player and is externally positionable by simple manual movements.

Other and further objects, features and advantages will be apparent from the following description of a presently preferred embodiment of the invention, given for the purpose of disclosure, and taken in conjunction with the accompanying drawings in which like character references designate like parts throughout the several views and where:

Figures 1, 2:
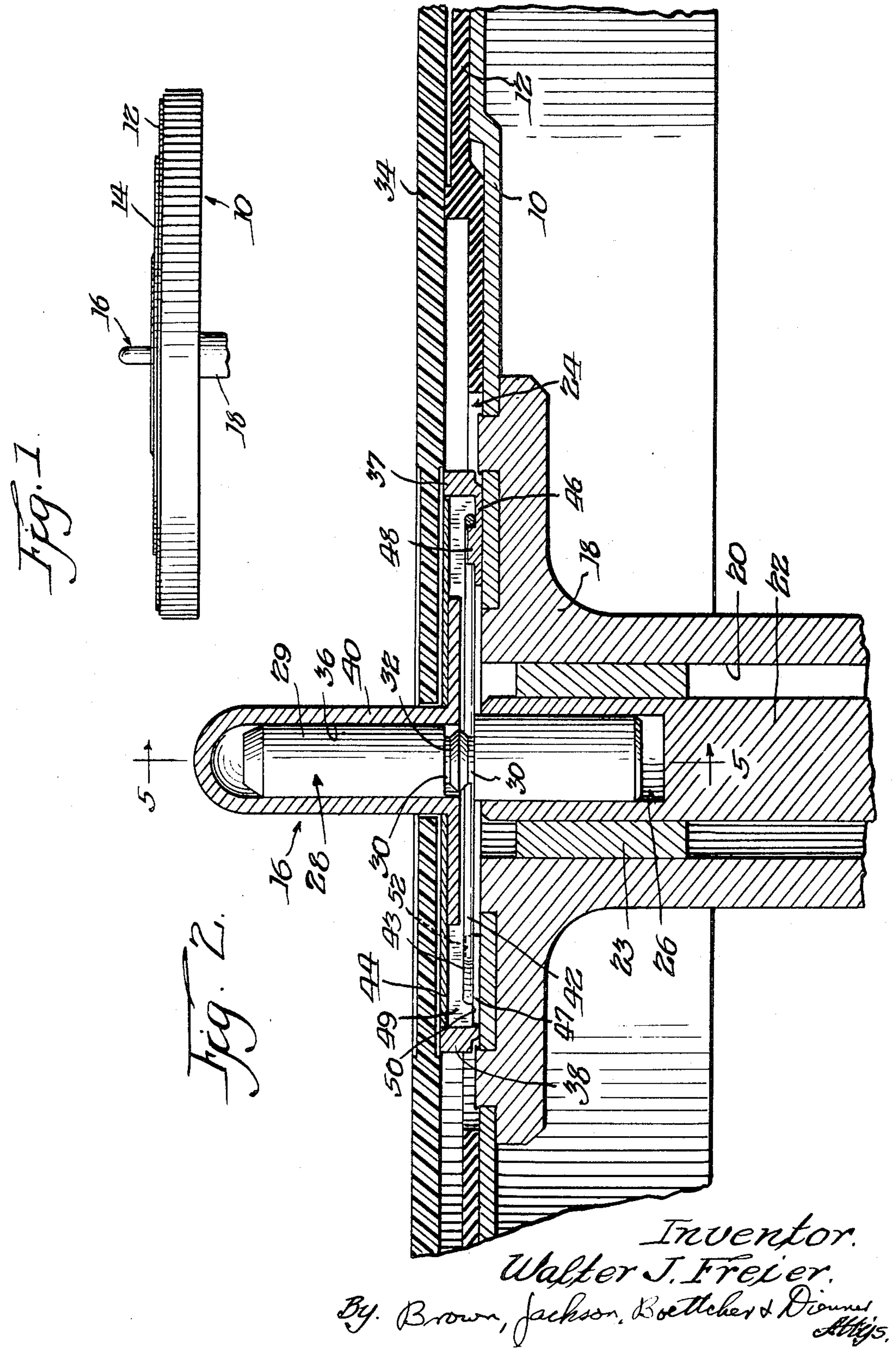
FIG. 1 is an elevational view of a record player turntable and its cover supporting a record having a center opening, and an adapter centering the record according to the present invention.
FIG. 2 is an enlarged partial elevational view showing the adapter in section in a lowered position centering a record having a relatively small center orifice.

Referring now to the drawings, a supported rotatable turntable 10 having a protective cover 12 affixed to its upper surface is shown supporting a conventional record disc 14 which has a large center orifice. An adapter 16 according to the present invention is located in a raised position within the large orifice and centers the disc 14. It is understood that the turntable 10 may be driven by a motor (not shown) of a suitable kind. In FIG. 2 a hub 18 is peened so as to securely attach it to the turntable whereby the hub 18 supports the turntable. The hub and the turntable rotate as a unit. The hub 18 has an axial bore 20 formed therethrough coaxially with the center of rotation of the turntable. A central depression or pocket 24 may be formed in the center of the turntable and its cover and surrounds bore 20. The depression is sufficiently spacious and deep to permit a portion of the adapter 16 to enter it.

A spindle base 22 is axially mounted within the bore 20 in a spaced apart relationship. A bearing 23 is suitably attached between the base 22 and hub 18 in bore 20 to allow the turntable to rotate about the spindle. The spindle base 22 has an axial hole 26 formed in its upper end. A cylindrical spindle or post 28 is attached within hole 26. The spindle base 22 and cylindrical spindle 28 may be made as one unit to provide a cylindrical spindle base.

An upper portion 29 of the cylindrical spindle extends above a plane defined by the bottom surface of the depression 24. A plurality of vertically spaced-apart reliefs 30 are formed in the periphery of the extending portion of the spindle. In a preferred embodiment the reliefs so formed are a plurality of annular grooves approximately parallel to the top plane of the turntable and its cover. Camming surfaces 32 separate the grooves which as shown in FIG. 2 are essentially conical in shape and are arranged to define a V in cross section when considered together.

In FIG. 2 the adapter 16 mounted coaxially about the extending portion 29 of the cylindrical spindle 28 is shown in its lowered position within the pocket 24 centering a phonograph record 34 having a small center orifice. The adapter includes a hollow upstanding generally cylindrical portion or ring 40 having a cylindrical aperture 36 which surrounds and is penetrated by the spindle 28.

About said upstanding hollow portion adjacent the lower end thereof is an integral annular disc portion 38 having an outside diameter suitable for centering records with large center holes. The smaller diametered annular ring 40 of the adapter projects above the disc 38 and has an outside diameter suitable for centering records with relatively small locating orifices. The circumferences of the portion 38 and the ring are coaxial. A hair pin or U-shaped spring 42 is attached to the adapter 16 by a suitable means. The spring 42 latches into selected grooves 30 to effectively position the adapter vertically on the spindle 28.

In a preferred embodiment the ring 40 takes the form of a cap as shown in FIG. 2 for presenting a more pleasing appearance and making manual manipulation of the adapter easier. A raised flange 37 may extend above the disc portion 38 adjacent its outer periphery to provide an opening for an annular insert 44 which surrounds the ring 40 and upon which a medallion or message may be printed. The upper surfaces of the flange 37 and insert 44 define a relatively smooth plane as does the upper surface of the disc 38 if the flange and insert are not provided.

Figures 3, 4, 5:
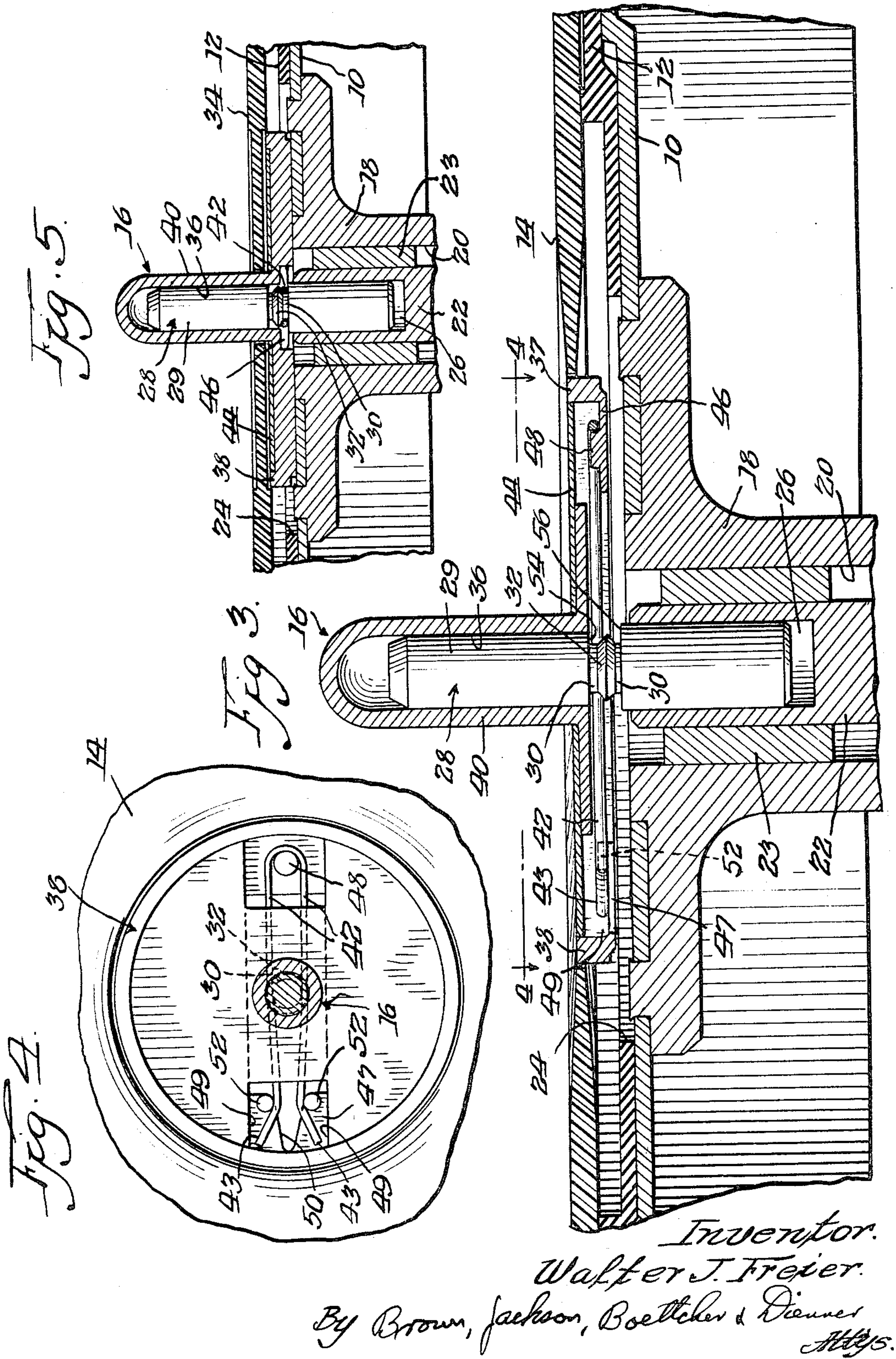
FIG. 3 is a partial elevational view in section showing the enlarged adapter in a raised position and centering a record having a large center opening.
FIG. 4 is a plan view showing the U-shaped spring detented into a depression formed in a center spindle taken along the line 4—4 of FIG. 3.
FIG. 5 is an elevational view in section of the adapter in a lowered position taken along line 5—5 of FIG. 2.

In FIG. 3 the adapter 16 is shown in a raised position above the upper planer surface of the turntable. In this position the adapter centers a record having a large center opening.

In FIGS. 3 and 4 the U-shaped spring 42 is compressed and urged into a selected groove 30. The latching of the spring into the groove positively positions the adapter at a desired vertical level as for example when the record is of the 45 r.p.m. type conventionally having a large size opening. Such latching of the spring is easily seen in FIG. 5 wherein the spring 42 is detented in a lower groove for positioning a record of the 78 or 33⅓ r.p.m. type having a small diameter hole.

A preferred embodiment of means for attaching the spring 42 to the adapter is shown in FIG. 4. A pair of inwardly facing shelves 46 and 47 are formed in a spaced apart relationship on the disc 38. A raised locator pin or integral projection 48 is formed on one of the shelves 46 for securely positioning and centering the closed end of spring 42. The other shelf 47 has an open slot 50 formed therein with its opening facing the center of the disc 38 through which the open end portions of the spring are inserted and positioned upon the shelf. A pair of integral compression posts 52 are positioned on the shelf 47 adjacent each side of and toward the open end of the slot 50 to aid in compressing the open end portions of the spring 42 relatively toward each other. In an alternate construction post 52 may be omitted in which event the spring 42 may be positioned so that its outwardly deflected ends 43 resiliently engage against the opposed sidewalls 49 along either side of shelf 47. By restraining the open end portions of the spring, the spring is urged into positive positionment within a selected groove and thus positively positions the axial location of the adapter 16. The resilient character of spring 42 and its thus explained confinement of its ends 43 and bight about pin 48 facilities the camming action exerted thereon by surfaces 32 between the grooves 30, 30 as when raising or lowering the adapter. Radially disposed surfaces 54 and 56 at the outer portions of the grooves 30, 30 present abrupt surfaces which are perpendicular to the axis of the spindle. The surfaces 54 and 56 prevent accidental removal of the adapter from the spindle and provide accurate positive positionment of the adapter at a desired level.

When the spring is detented into a relatively higher groove (FIG. 3), the annular disc portion 38 of the adapter is latched at a level position above the plane established by the turntable and its cover. In this position large center hole records may be rotated concentrically with the center of the turntable. To play small center hole records the adapter is vertically depressed. The spring is unlatched from the higher groove and cammed therefrom by the surfaces 32. The spring is then detented into a lower groove. With the spring latched in this position, the disc 38 is maintained at a level position at least even with or below the plane of the turntable. The ring 40 extends above the plane and is the positioner for records with a small center orifice.

Thus the present invention provides an adapter which is an integral part of a phonograph, is convenient and positively positionable; yet can be moved by a simple manual lifting or depressing movement from a position outside of the player apparatus. A record turntable including such an adapter can accommodate and play records having differently sized centering orifices. The described spring latch, which can be cammed out of position as the adapter is moved, is simple in construction and positive in operation.

Although I have described my invention with respect to certain specific embodiments thereof, I do not wish to be thereby limited, as various modifications of my invention are intended to be encompassed within its true spirit and scope as indicated by the following claims.

I claim:

1. In a record player having a supported, rotatable turntable provided with a centrally formed depression the bottom of which defines a plane and with an axial bore, a record player adapter means for enabling records having central holes of different diameters to be centered and played on the same player which comprises: a stationary spindle positioned within the bore and having a portion extending above the plane defined by the bottom of the depression; a plurality of vertically spaced-apart annular grooves formed in the extending portion of the spindle; an adapter member including an annular disc portion with an outside diameter suitable for centering a record with a large center hole, said disc portion being movable between a lower position within the depression whereat said disc portion provides a relatively smooth surface with the plane established by the turntable and an upper position above said plane established by said turntable whereat said disc portion is positioned to center a record with a large center hole; a hollow cylindrical ring integrally formed with the disc portion for centering a record with a small center hole, the integral ring and disc portion mounted coaxially about the extending portion of the spindle to be manually movable in a relative vertical direction along the spindle; a U-shaped spring having its two legs positioned for latching into a selected one of said grooves to axially position the disc portion and ring; means for attaching the spring to the disc portion comprising a pair of spaced-apart inwardly-facing shelves formed in the disc portion of the adapter member radially within the disc portion for supporting the spring; a raised projection formed on one of the shelves for positioning and centering the closed end of the spring; the other of the shelves having an open slot formed therein with the opening of the open slot facing the center of the disc portion for passing the open end of the spring through to rest upon said other shelf; and integral compression posts adjacent each side of the slot on said other shelf restraining the open end of the spring for urging the spring to positively latch into a selected one of said grooves and coaxially locate a record having a chosen center hole size, the spring being positively latched into a lower groove with the disc portion positioned at least even with the plane of the turntable and the ring above the plane of the turntable whereby a record having a small center hole may be centered and played; and camming surfaces on the extended portion of the spindle between the grooves for aiding the spring to unlatch from the lower groove and cam into and latch in an upper groove to position the disc portion above the plane of the turntable whereby a record having a large center hole may be centered and played.

2. In a record player having a supported, rotatable turntable provided with a centrally formed depression the bottom of which defines a plane and with an axial bore, a record player adapter means for enabling records having center holes of different diameters to be centered and played on the same player which comprises: a stationary spindle positioned within the bore and having a portion extending above the plane defined by the bottom of the depression; a plurality of vertically spaced-apart annular grooves formed in the extending portion of the spindle; an adapter member including an annular disc portion mounted coaxially about the extending portion of the spindle, the disc portion having an outside diameter suitable for centering a record with a large center hole, said disc portion being relatively movable between a lower position within the depression whereat said disc portion provides a relatively smooth surface with a plane established by the turntable and an upper position above said plane established by said turntable whereat said disc portion is positioned to center a record with a large center hole; a hollow cylindrical ring integrally formed with the disc portion for centering a record with a small center hole, the integral ring and disc portion mounted coaxially about the extending portion of the spindle to be manually movable in a relative vertical direction along the spindle; a U-shaped spring having portions latching into a selected one of said grooves to axially position the disc portion and ring; and means for attaching the spring to the disc portion comprising a pair of inwardly facing shelves formed in a spaced-apart relationship on the disc portion of the adapter member radially within the disc portion; a raised locator pin formed on one of the shelves for centering the closed end of the spring; and the other of the shelves having opposed side walls and an open slot formed in said other shelf with the opening of the slot facing the spindle for passing the open ends of the spring through to rest upon said other shelf, the spring resiliently engaging the opposed side walls to confine its said ends, the resilient character of the spring facilitating the latching action exerted on the spring when raising and lowering the integral ring and disc portion.

References Cited

UNITED STATES PATENTS

| | | | |
|---|---|---|---|
| 2,762,627 | 9/1956 | Johnson | 274—39 |
| 3,241,840 | 3/1966 | Freier | 274—39 |

LEONARD FORMAN, *Primary Examiner.*

J. M. FREED, *Assistant Examiner.*